R. E. WEBER.
WIRE FENCE MACHINE.
APPLICATION FILED FEB. 12, 1913.
1,115,630.
Patented Nov. 3, 1914.
9 SHEETS—SHEET 3.
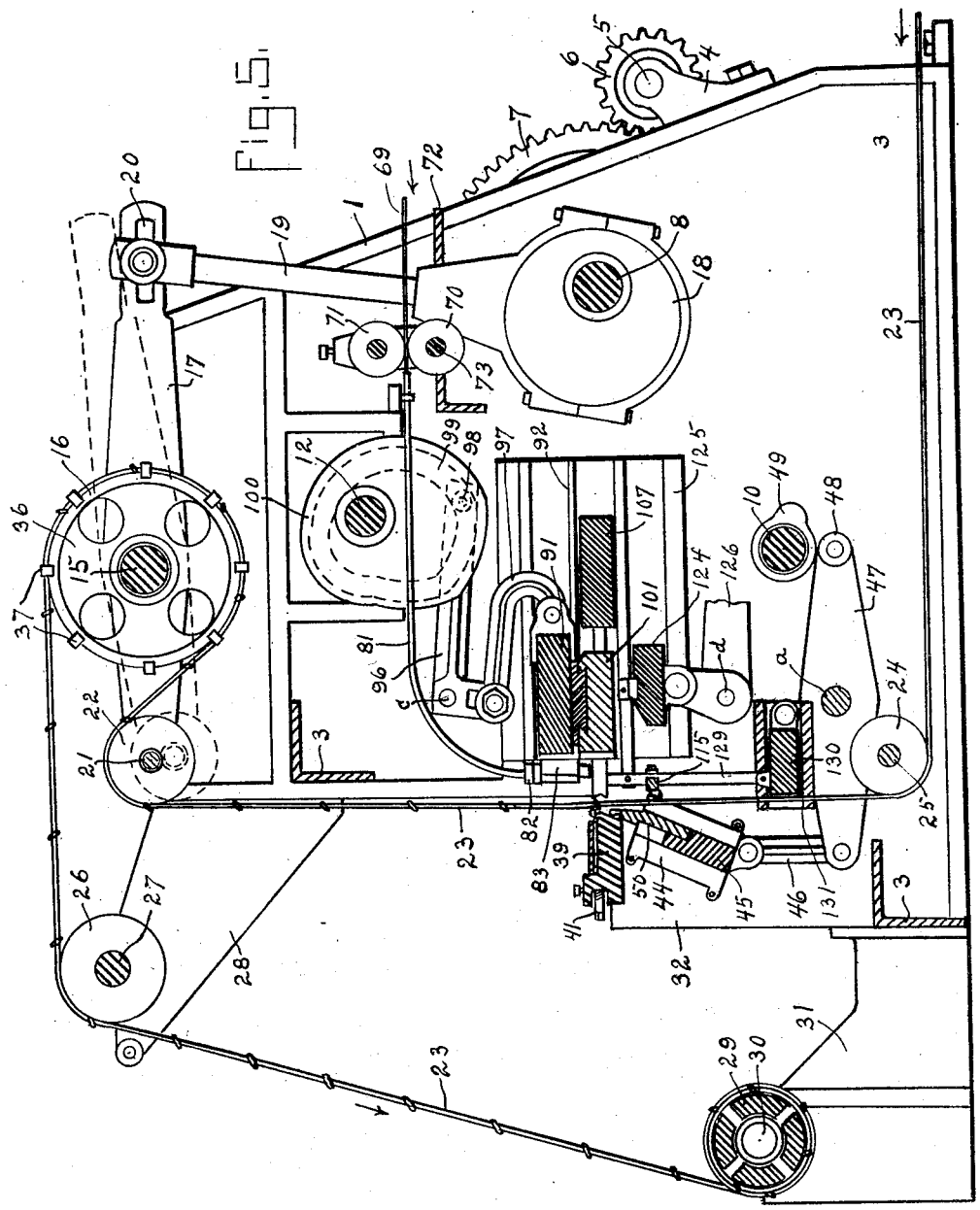

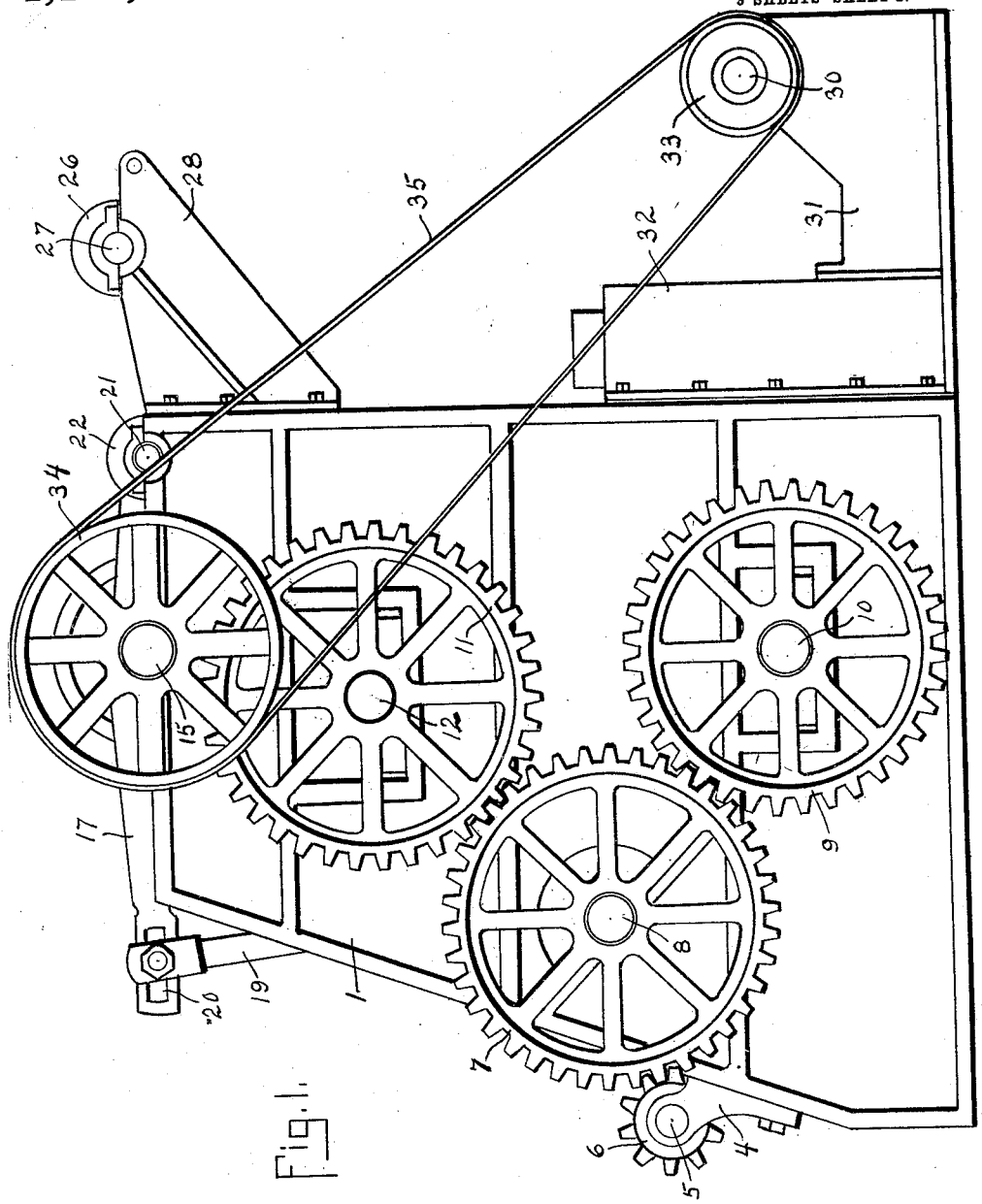

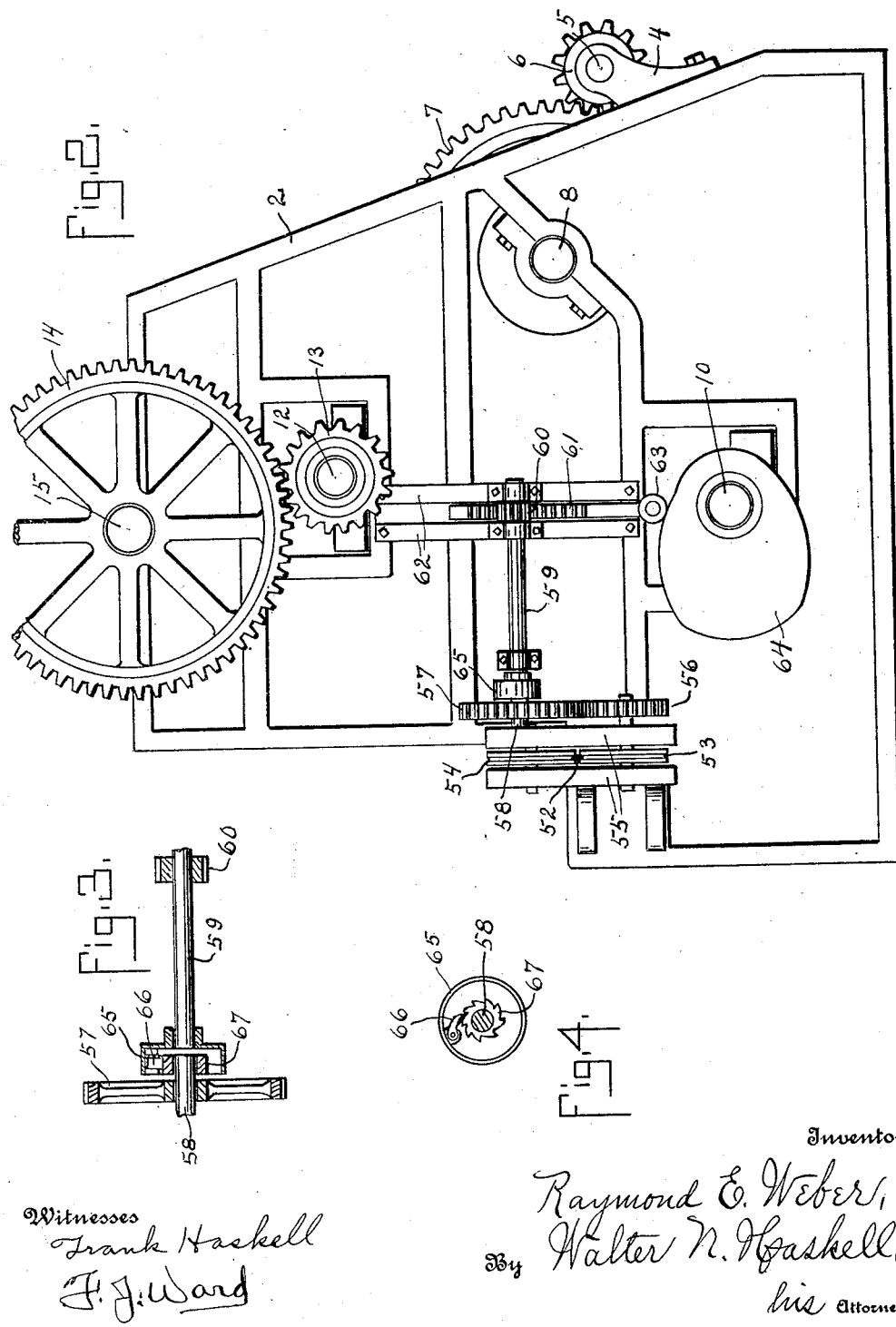

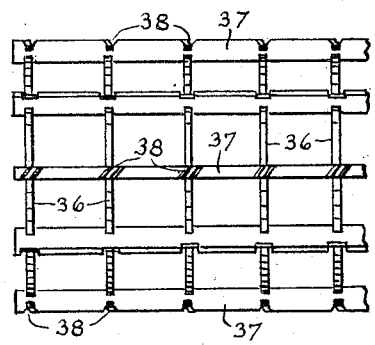
Fig. 7.
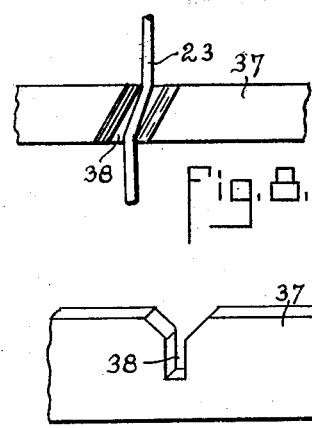
Fig. 8.
Fig. 9.
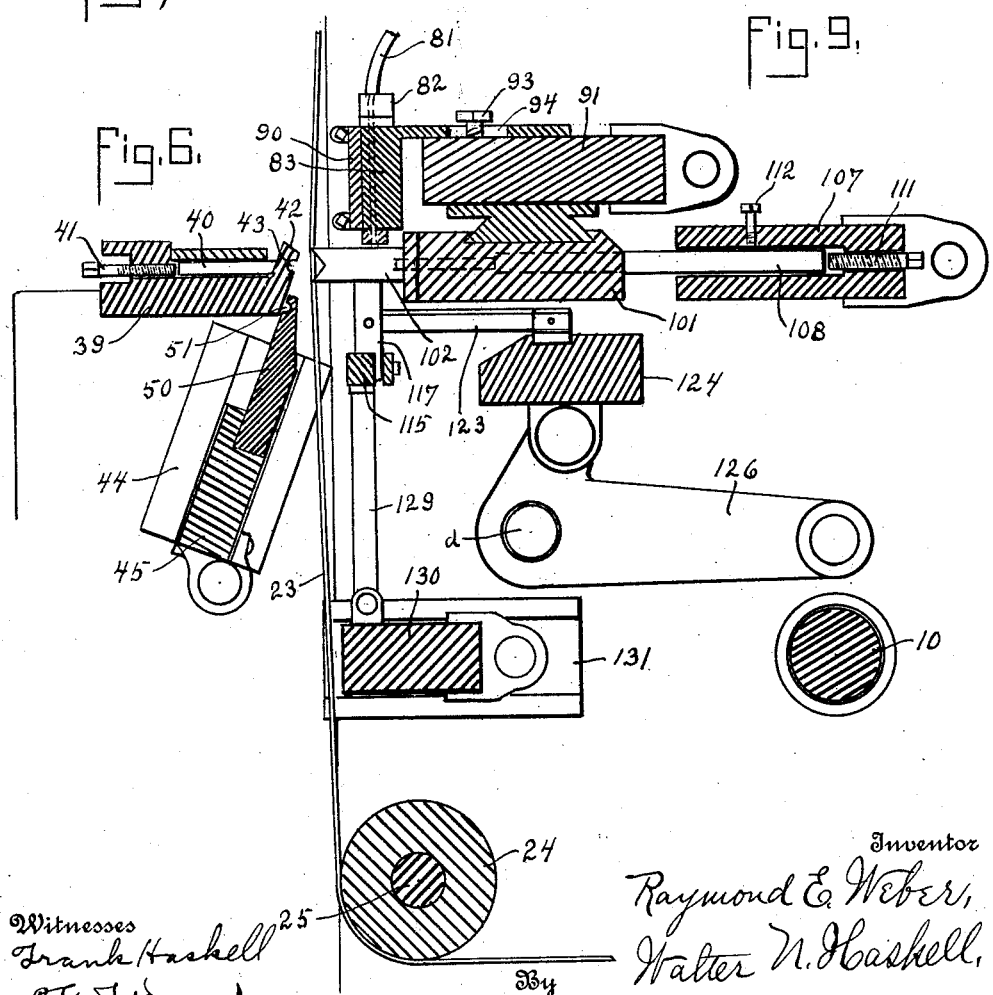

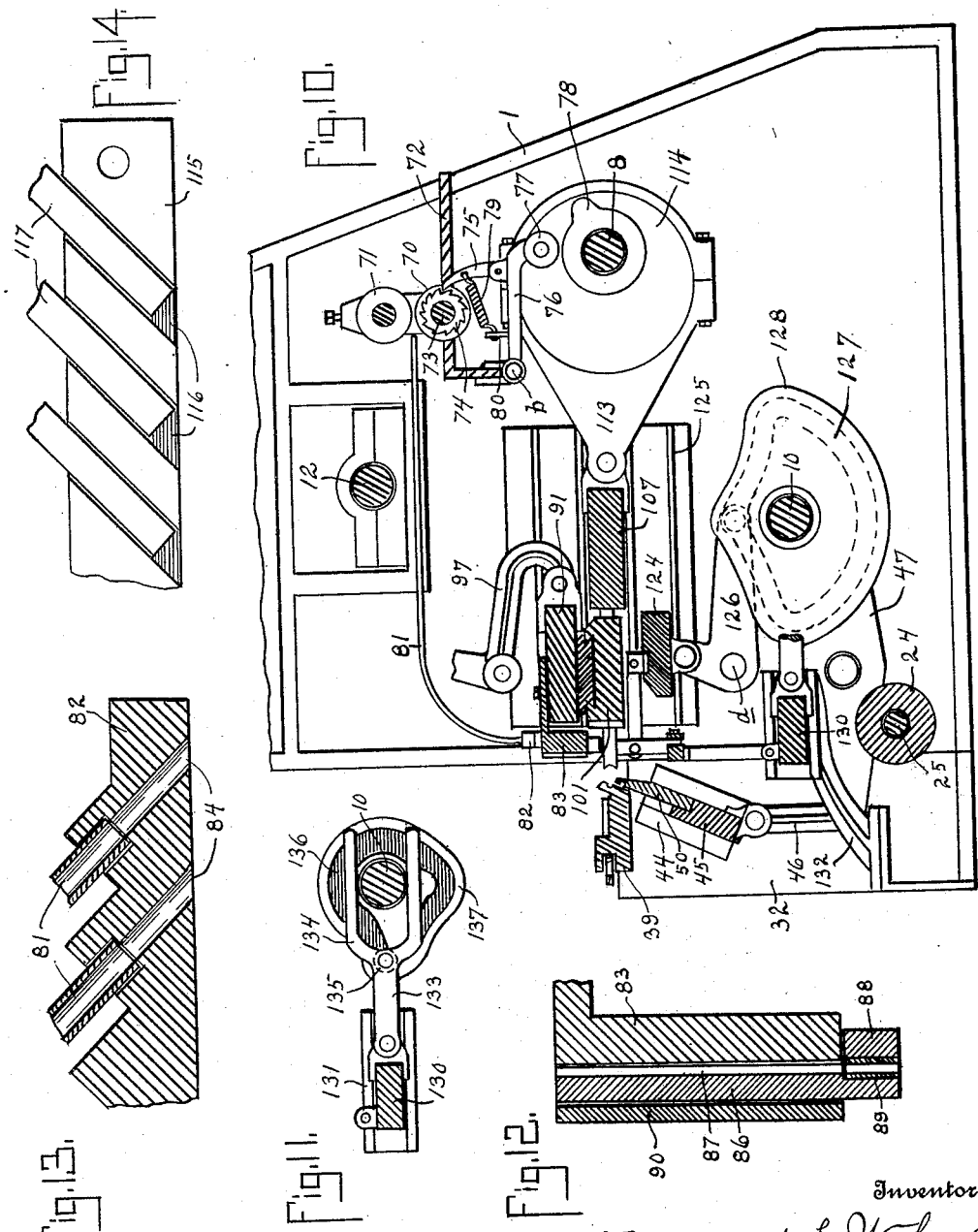

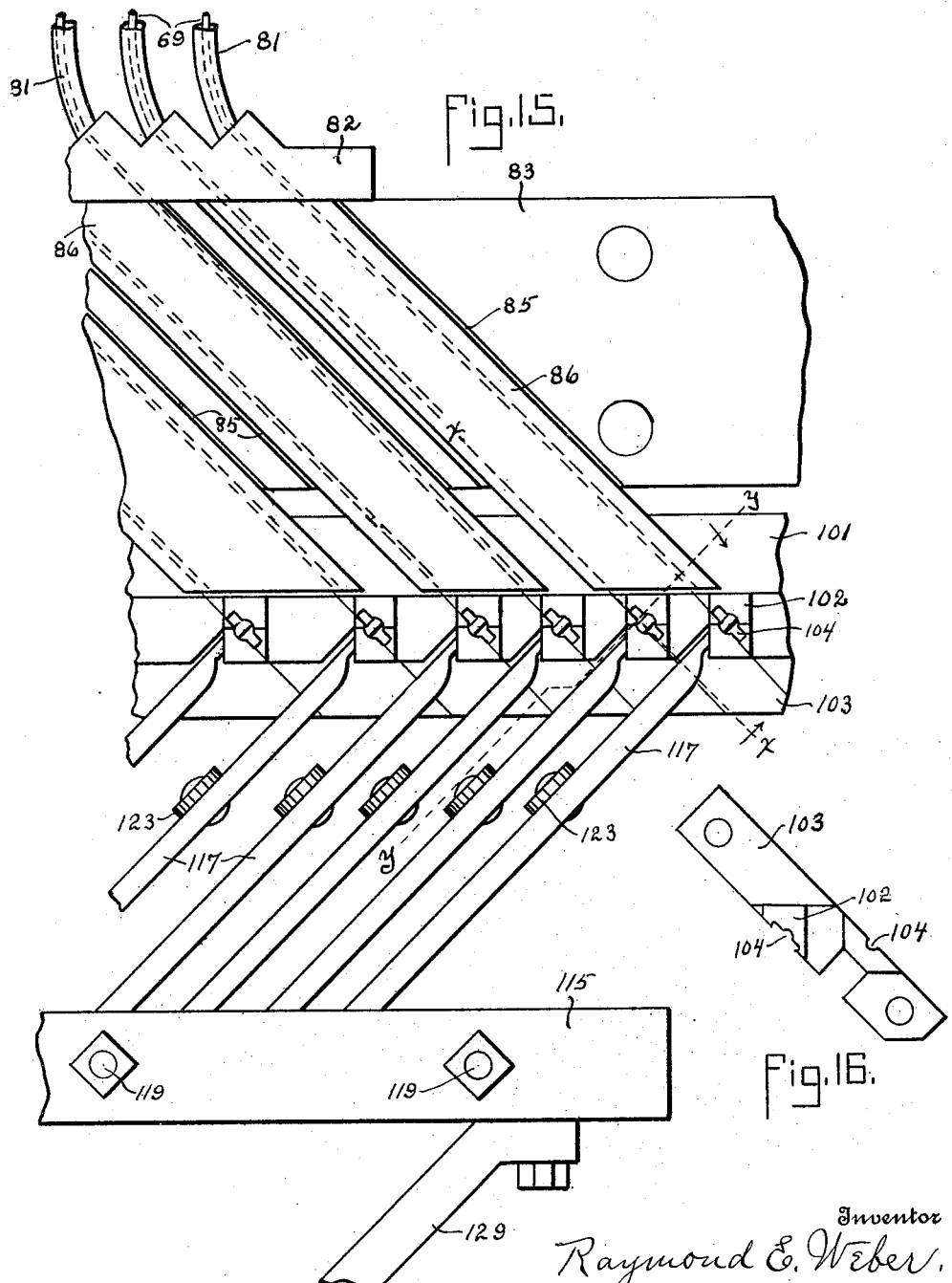

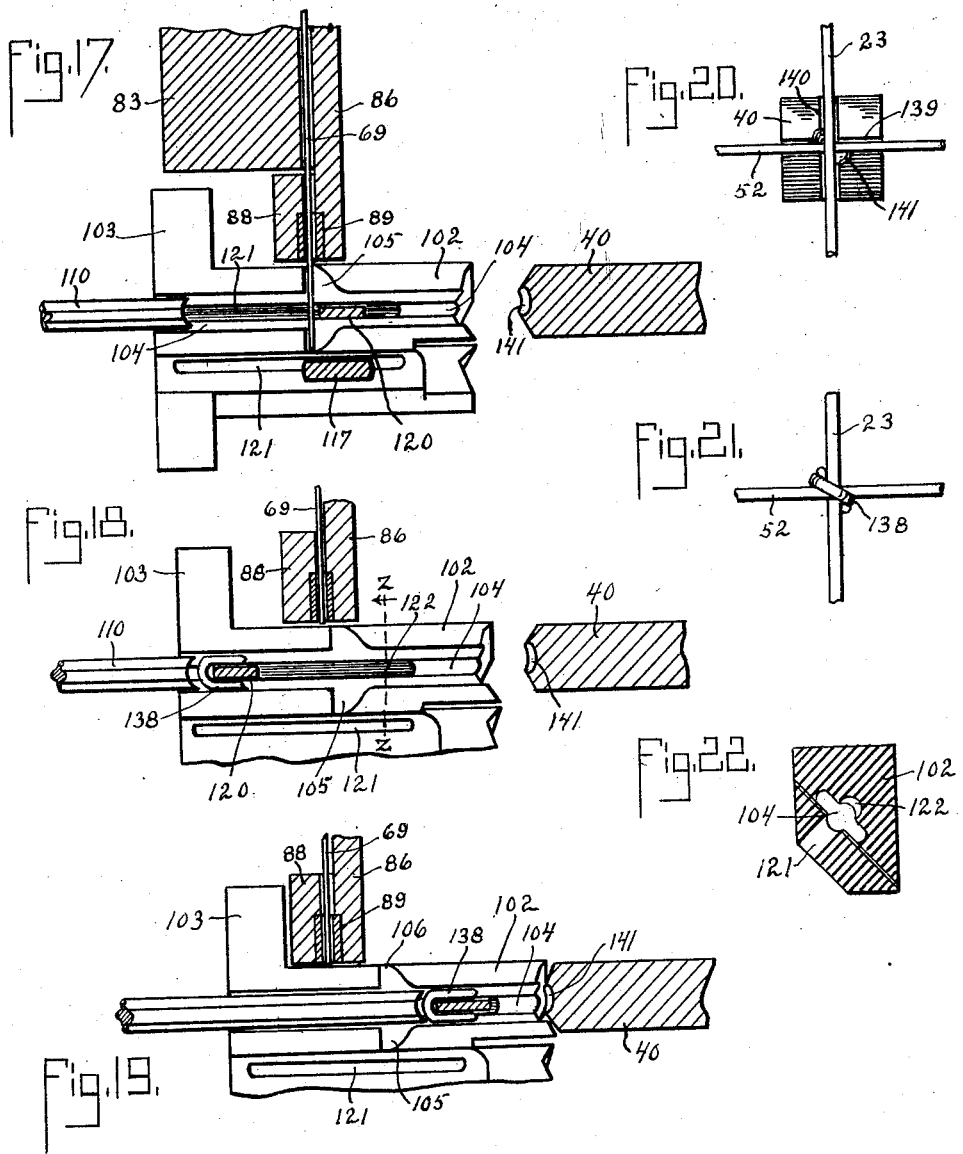

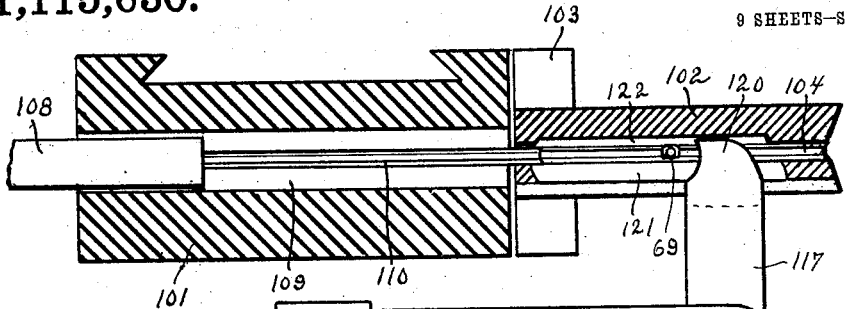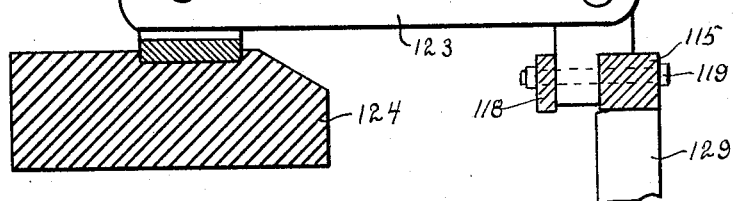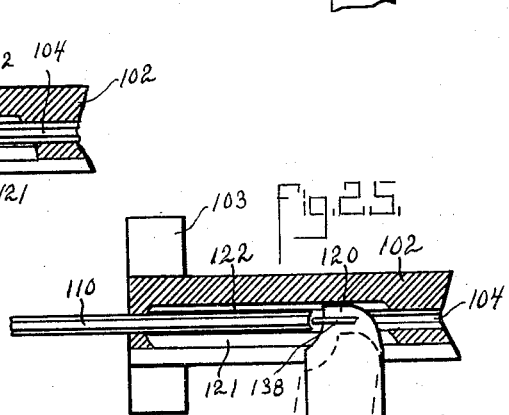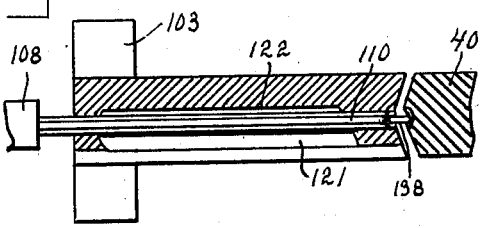

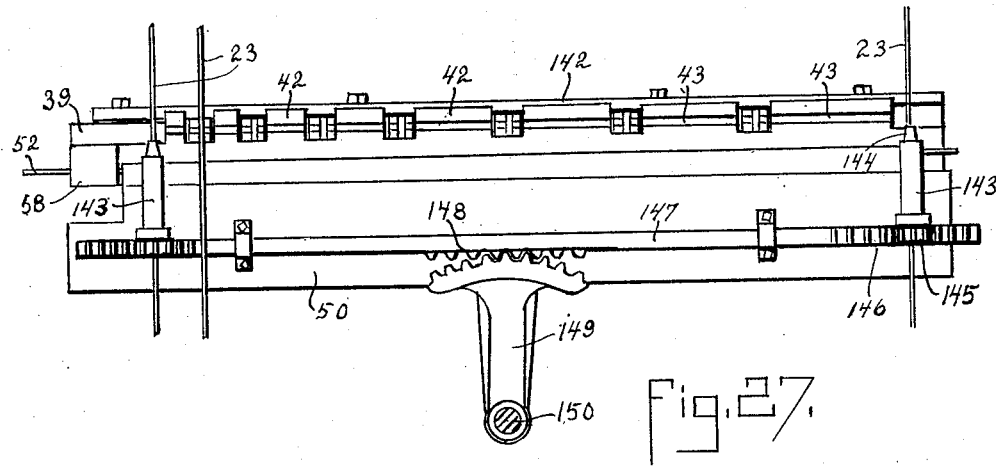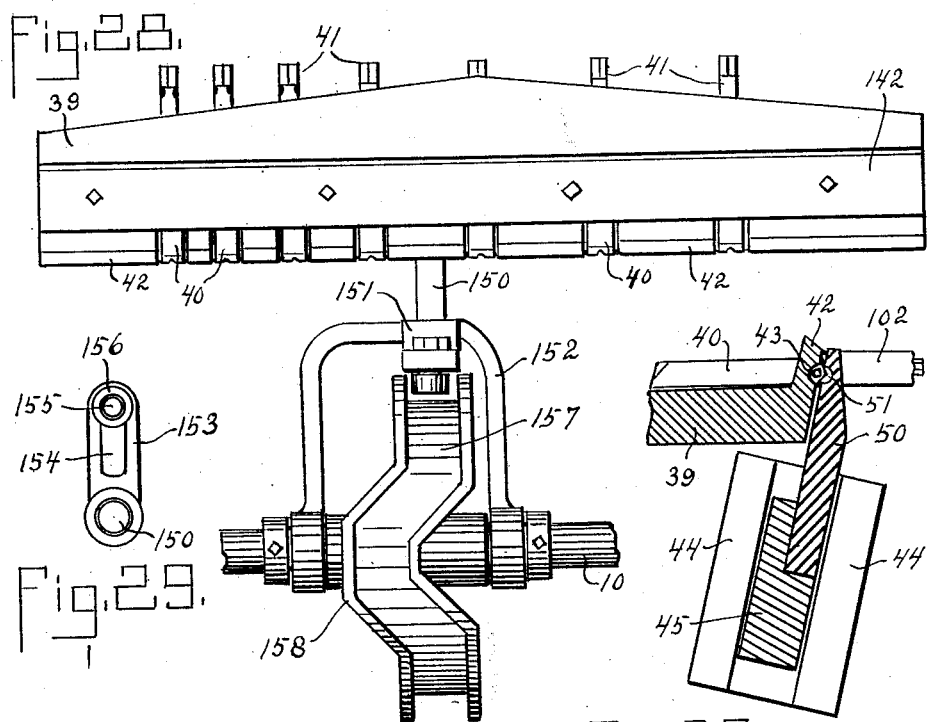

UNITED STATES PATENT OFFICE.

RAYMOND E. WEBER, OF STERLING, ILLINOIS, ASSIGNOR TO W. M. DILLON, OF STERLING, ILLINOIS.

WIRE-FENCE MACHINE.

1,115,630.  Specification of Letters Patent.   Patented Nov. 3, 1914.

Application filed February 12, 1913. Serial No. 747,862.

*To all whom it may concern:*

Be it known that I, RAYMOND E. WEBER, a citizen of the United States, residing at Sterling, in the county of Whiteside and State of Illinois, have invented certain new and useful Improvements in Wire-Fence Machines, of which the following is a specification.

My invention has reference to machines for the production of wire fencing, and is specially designed for the construction of that class of fencing which is known as the "square mesh" and in which the intersecting wires of the fence are fastened to one another by means of separate tie wires, in the shape of a ring or equivalent locking means.

By the use of my machine the strand wires of the fence are enabled to pass therethrough with a substantially continuous movement, the transverse wires being attached thereto at regular intervals during such passage, and there is broadly embodied therein mechanical devices for effecting the movement of a plurality of strand wires simultaneously through the machine; devices for feeding a succession of stay wires transversely of the line of feed of the strand wires; mechanism for feeding a plurality of wires into the machine to be formed into tie wires; and mechanism for seating said tie-wires at the points of intersection between the strand and stay wires of the fence.

In the drawings: Figure 1 is a side elevation of the machine. Fig. 2 is a similar view of the opposite side of the machine, with some of the parts omitted. Fig. 3 is a detail, partly in section, of the shaft 59 and appurtenant devices. Fig. 4 is a detail of the wheel 65. Fig. 5 is a vertical section longitudinally of the machine. Fig. 6 is a central enlargement of the parts shown in Fig. 5. Fig. 7 illustrates a portion of the pull-out reel. Fig. 8 is a detail showing a section of one of the bars 37. Fig. 9 is a similar view, in perspective. Fig. 10 is a vertical section in a plane parallel to that shown in Fig. 5. Fig. 11 shows, in detail, the mechanism for actuating the bar 131. Fig. 12 is a section through the plate 83 in line with the feed of one of the tie-wires. Fig. 13 is a detail, in section of the guide-plate 82. Fig. 14 shows the inner face of the clamp-bar 115. Fig. 15 is an enlarged detail showing the tie-wire guide mechanism, and former-bars therefor. Fig. 16 shows one of the former-head plates, detached, in front elevation. Figs. 17, 18 and 19 show the tie forming devices in different positions, on the broken line $x$—$x$ of Fig. 15. Fig. 20 is an end view of one of the dies 40. Fig. 21 shows the intersection of a strand and stay wire, with the tie wire seated thereon. Fig. 22 is a cross-section through one of the former-heads in the line $z$—$z$ of Fig. 18. Figs. 23 to 26 inclusive are longitudinal sections of the former heads 102 in a broken line $y$—$y$ of Fig. 15, showing the operation of the former mechanism in the process of forming and seating the tie. Fig. 27 is an inner view of the die-plate 39 and cross-plate 50. Fig. 28 is a plan view of the plate 39 and mechanism for actuating the rack-bar 147. Fig. 29 is a detail of the crank-arm 153. Fig. 30 is an enlarged detail in cross-section of the die-plate 39 and bar 44.

Similar parts are indicated by corresponding numbers of reference throughout the several figures.

In most of the figures the mechanical devices are shown only as they have reference to the attachment of the stay wire to one of the line wires of the fence, it being understood that such parts are duplicated for any number of such strand wires as the fence may contain, and the illustration herein of one of such wires, or of the mechanisms pertaining thereto, applies to any other similar wire which the fencing may contain, and which is not shown and mentioned herein.

The main part of the frame of my machine consists of a pair of side-plates 1 and 2, united by cross-plates 3. Upon the rear edge of the plate 1 is fixed a bearing 4, in which is mounted a rotary shaft 5, to which power may be applied in any desired manner. Fixed to the shaft 5 is a gear-pinion 6, in mesh with a gear-wheel 7 secured to a shaft 8, transversely mounted in the machine The wheel 7 engages and actuates a similar gear-wheel 9 on a transverse rotary shaft 10, suitably supported in the lower part of the plates 1 and 2. The wheel 7 also engages a similar wheel 11 on a shaft 12, rotatably mounted in the plates 1 and 2. On the opposite end of the shaft 12 from the wheel 11 is a gear-pinion 13 engaging a gear-wheel 14 on a rotary shaft 15 journaled in the upper edges of the plates 1 and 2.

Secured to the shaft 15 is a pull-out reel 16, and fulcrumed on such shaft is a pair of levers 17, connected with eccentrics 18 on the shaft 8 by means of arms 19. (Fig. 5.) Said arms have a pivotal connection with the levers 17 at their upper ends, and by means of slots 20 in said levers an adjustment of the pivot is permitted. At the forward ends of the levers 17 is supported a shaft 21, upon which is held a roller 22. Strand wires 23 enter the machine at the lower and rear side thereof, pass partially around a roller 24 on a cross-shaft 25 supported in the plates 1 and 2; thence upwardly over the roller 22, partially around the reel 16; over a roller 26 on a shaft 27 mounted in frame extensions 28, and thence downwardly to a reel 29 on a shaft 30, rotatably mounted in extensions 31 secured to projections 32 of the frame. The shaft 30 is actuated by means of a pulley 33 fixed on one end thereof, and driven from a pulley 34 on the shaft 15, by means of a belt 35.

At each rotation of the shaft 8 the movement of the eccentrics 18 imparts to the levers 17 a reciprocating or rocking movement, which operates to carry the roller 22 downwardly, as indicated in broken lines, and then upwardly again. In the downward movement of such roller there results a slackening of the strand wires 23, causing an instant's interruption of the movement thereof, and in the return movement such wires are again tightened, and the movement thereof continues. During the operation of the machine the reel 16 is continuously operated at a comparatively low rate of speed, and the interruption of the strand wires takes effect only in that part of the machine through which said wires pass before reaching the reel.

The reel 16 is preferably formed of a plurality of disks 36 fixed on the shaft 15, to the peripheries of which disks are secured a plurality of bars 37, provided at intervals with diagonally disposed recesses 38, having inwardly converging walls. Said bars are provided with recesses 38 corresponding in number and position with the strand wires of the fence, as the same pass through the machine, such wires being guided into the recesses by the converging walls thereof, and gripped at the opposite ends of such recesses by reason of the line of direction thereof being diagonal with the line of movement of the wires. It is only necessary to have alternate bars provided with the recesses 38.

Supported on the projections 32 is a die-plate 39, (Figs. 5 and 6,) provided with transverse recesses in which are located a series of dies 40, capable of adjustment longitudinally by means of set-screws 41 in the die-plate in front thereof. At the inner edge of the plate 39 is a series of inwardly inclined projections 42, provided in their inner faces with grooves 43, in horizontal alinement. On the inner faces of the projections 32, below the plate 39 are inclined ways 44, in which a cross-bar 45 is slidably mounted by means of a pair of arms 46 pivotally connected with said bar, and supported on the forward ends of a pair of levers 47, one only of which is shown, which levers are fulcrumed as at $a$, and provided at their inner ends with rollers 48, actuated by cams 49 on the shaft 10. Fixed to the bar 45 is a cross-plate 50, provided on its inner face with a channel 51, which is normally closed by the inner edge of the plate 39.

At each rotation of the shaft 10 the cams 49 force the inner ends of the levers 47 downwardly, raising the opposite ends thereof, and causing an upward movement of the bar 45. The degree of inclination of such bar corresponds with that of the inner face of the plate 39, and the upward movement thereof causes the upper part of the plate 50 to pass upwardly along said face, until the channel 51 registers with the grooves 43, as appears in Fig. 30.

When the plate 50 is in lowered position a stay wire is introduced into and through the channel 51 by means of a pair of feed-rolls 53 and 54 rotatably mounted in supports 55 on the outer face of the plate 2. Power is imparted to the wheel 53 from a gear-wheel 56 on the same shaft therewith and actuated by a gear-wheel 57 on a short shaft 58 journaled in the inner support 55. In line with the shaft 58 is a shaft 59, on which is fixed a gear-pinion 60, actuated by a rack-bar 61 vertically slidable in ways 62 fixed to the plate 2. At its lower end the rack-bar 61 is provided with a roller 63 engaged by a cam 64 on the shaft 10. On the end of the shaft 59 opposite to the pinion 60 is a hollow wheel 65, in which is pivoted a pawl 66, adapted to engage a ratchet-wheel 67 on the end of the shaft 58. At each rotation of the shaft 10 the cam 64 imparts an upward movement to the rack-bar 61, rotating the shaft 59 in a direction to cause the engagement of the pawl 66 with the ratchet-wheel 67, whereby the shaft 58 is rotated and the movement thereof communicated to the feed-rolls 53 and 54, causing the introduction of a length of the cross wire 52 into the machine. Immediately after passing through the feed-rolls the wire 52 passes through a perforated block 68 rigidly attached to the die-plate 39, Fig. 27, and thence through the channel 51 in the cross-plate 50. The operation of the feed-rolls 53 and 54 is of such duration as to introduce into the machine a sufficient amount of the wire 52 to form one of the transverse or stay wires of the fence. In the return movement of the rack-bar 61 the feed-rolls are idle, and at this time the cross-plate 50 is raised, causing a severance of the wire 52 between the end of such plate and the block 68.

At the rear of the machine a plurality of wires 69 is introduced into the machine through pairs of feed-rolls 70 and 71 mounted on a cross-plate 72 fixed between the plates 1 and 2. (Figs. 5 and 10.) The lower roll 70 is fixed on a shaft 73, rotatably mounted in the cross-plate 72, and on said shaft is fixed a ratchet-wheel 74, engaged by a pawl 75, pivoted on an arm 76 pivotally supported from the plate 72, as at $b$. At its free end the arm 76 is provided with a roller 77, engaged by a cam-wheel 78 fixed on the shaft 8. At each rotation of the shaft 8 the arm 76 is raised by the cam 78, causing a partial rotation of the rolls 70 and 71 in a direction to draw the wire 69 into the machine, a sufficient amount being introduced at each movement of the rolls to provide one of the tie-wires of the fence. Engagement of the pawl 75 with the wheel 74 is assured by means of a contractile coiled spring 79, attached at one end to said pawl and at the other end to a post 80 on the arm 76.

Immediately after passing through the feed-rolls the wire 69 enters a tube 81, by which it is directed forwardly and downwardly to a guide-block 82 on a cross-bar 83 rigidly supported between the plates 1 and 2. At its lower end the tube 81 connects with a passage 84 in the block 82, which passage extends downwardly in a diagonal direction, and in a line at substantially forty-five degrees to the line of travel of the line wires 23. The bar 83 is provided in its outer face with transverse recesses 85, in line with the passages 84, in which recesses are held guide-bars 86, provided on their inner faces with guide-channels 87, into which the wires 69 are directed by the guide-block 82. At their lower ends the bars 86 extend beyond the bar 83, and are provided with rearward projections 88, in which are bushings 89 forming a continuation of the channels 87. The bars 86 are held in place by means of a clamp-plate 90 secured to the outer face of the bar 83.

In rear of the bar 83 a cross-bar 91 is slidably supported on ways 92 on the inner faces of the side-plates 1 and 2, the bar 83 being preferably provided with a rearwardly extending plate connected with the bar 91 by means of bolts 93 passing through slots 94 in said plate, and causing a slidable contact of said bar and plate. (Fig. 6.) A bell-crank lever 96 is fulcrumed above the bar 91, as at $c$, and connected with said bar by means of a bent arm 97, pivotally attached to the short arm of said lever at one end and to the rear edge of the bar 91 at the other. The long arm of the lever 96 is provided with a roller 98, engaged by a cam-track 99, (broken lines) in one face of a cam-wheel 100 fixed on the shaft 12. At each rotation of the shaft 12 the bar 91 is given an eccentric forward and return movement, for the purpose hereinafter shown.

Supported from the bar 91 is a cross-bar 101, to the forward edge of which are attached former heads 102, by means of plates 103 integral therewith. Extending through each of the former-heads and plates 103 is a channel 104, transversely of which is a channel 105, having an opening 106 in line with the line of movement of the wire 69 when the former-head 102 is in a normal position, as shown in Fig. 17. The outer ends of the former-heads are of a modified concave form, to correspond with the inner ends of the dies 40, which are of a contrary shape.

In rear of the cross-bar 101 is slidably mounted a cross-plate 107, in which are held bars 108 extending forwardly into passages 109 in the bar 101, and having fixed in their outer ends plungers 110, corresponding in shape, in cross-section, with the channels 104, and adapted to enter and traverse said channels. (Figs. 6 and 23.) The bars 108 are adjustable by means of bolts 111 in the inner edge of the bar 107, and are held in place by set-screws 112. Movement is imparted to the plate 107, to cause a forward and rearward action thereof, by means of eccentric arms 113 mounted on eccentrics 114 fixed on the shaft 8.

Below the former-heads 102 is a clamp-bar 115, extending transversely of the machine, and provided in its inner face with diagonally disposed recesses in which are held the lower ends of former-bars 117, which project upwardly at right angles to the line of movement of the wires 69, and are held in place by means of a clamp-plate 118 fixed to the bar 115 by means of bolts 119. The upper ends of the bars 117 are projected into fingers 120 which are inserted through slots 121 in the heads 102, and extend across the channels 104 and into grooves 122 inside thereof. (Fig. 23.) To each of the formers 117 is pivotally connected an arm 123, the other end thereof being pivotally connected with a cross-bar 124, slidably supported at its ends on ways 125 on the inner faces of the plates 1 and 2. To the lower face of the bar 124 is pivoted the short arm of a bell-crank lever 126, fulcrumed as at $d$, and provided at the end of its long arm with a roller engaged by a track 127 (broken lines, Fig. 10) in one of the faces of a cam-wheel 128.

The clamp-bar 115 is supported by two or more bars 129 pivotally connected at their lower ends to a bar 130 slidable in ways 131 supported on brackets 132 fixed on one of the cross-plates 3. Pivotally secured to the rear of the bar 129 is a pair of arms 133, one only being shown, which arms are projected rearwardly into yokes 134 the arms of which embrace the shaft 10. (Fig. 11.) The arms 133 are provided with rollers 135 engaged by cam-tracks 136 of cam-wheels 137 fixed on the shaft 10. At each rotation of said shaft an eccentric forward and return movement is imparted to the bar 130, the horizontal position of the arms 133 being maintained by means of the yokes 134.

Each movement of the feed-rolls 70 and 71 serves to introduce the end of the wire 69 into and transversely of the former-head 102 equivalent to the width of the channel 105, as shown in Fig. 17, following which the bar 91 is given a slight movement outwardly, carrying the head 102 with it, and severing the wire 69, as shown in Fig. 18. At this time the former-bar 117 is in position as shown in Fig. 23, and in section in Fig. 17. Immediately following the severing of the wire the bar 124 moves inwardly, carrying with it the bar 117 and finger 120, which latter engages the severed section of wire at a central point, and draws it inwardly, forming it into a staple 138. (Figs. 18 and 24.) The bar 130 is moved inwardly coincidently with the bar 124, retaining the vertical position of the formers 117. At the beginning of the staple-forming process the bar 108 is at the inner end of its movement, as in Fig. 6, in which position the plunger 110 is nearly withdrawn from the channel 104. (See Figs. 18 and 24.) In forming the staple the finger 120 carries it inwardly to a point just in advance of the end of the plunger, whereupon the bar 107 is moved outwardly, forcing the plunger 110 outwardly in the channel 104, and carrying the staple 138 toward the outer end of the former-head. Coincidently therewith the bars 124 and 130 move outwardly, causing the finger 120 to move just in advance of the plunger 110, retaining its position in the staple, and preventing the same from getting out of proper position while passing across the channel 105. When the finger has about reached its former position, as shown in Fig. 25, the bar 130 is moved suddenly inward again, drawing the inner ends of the bars 129 therewith, and permitting the finger 120 to drop downwardly out of the line of travel of the plunger 110, as shown in broken lines in said figure. Coincidently with the outward movement of the bar 107 the bar 91 has received an additional movement outwardly carrying the end of the former-head 102 into proximity with the end of one of the dies 40, as shown in Fig. 19. Just prior thereto has occurred the elevation of the cross-plate 50, carrying the severed stay wire 52 upward into line with the groove 43 of the die-plate 39, (Fig. 30,) and transversely of the series of strand wires 23. The forward movement of the former-heads 102 transfers the wire 52 from the channel 51 to the groove 43, and to grooves 139 in the ends of the dies 40 which coincide with the grooves 42, the strand wires being accommodated by vertical grooves 140 in the ends of said dies. While in this position the plunger 110 continues its movement, forcing the staple 138 out of the end of the channel 104, (Fig. 26) and against the end of the die 40, the ends of the staple entering recesses 141 and encircling the wires 23 and 52 diagonally, forming a loop or ring about the same. This is accomplished at the time when that portion of the strand wires is inactive. Upon the forming of the tie, the bar 91 is again moved inwardly, returning the heads 102 to their former positions, ready to receive another series of the tie-wires, the bar 130 again moving outwardly until the formers 117 again assume a vertical position, with the fingers 120 again in position in the heads 102. The grooves 122 therein permit the fingers to project a sufficient distance beyond the staple wire to preclude any danger of such wire slipping past the end of the finger, or becoming jammed between the same and the wall of the channel 104.

The dies 40 are held in place by means of a clamp-plate 142 secured to the upper face of the die-plate 39.

The former-heads 102 and dies 40 are necessarily provided for all of the strand wires 23 except the outer ones thereof, the ends of the stay wires being coiled upon the selvage wires of the fence in the usual manner, and for this purpose mechanism may be provided as shown in Fig. 27, wherein perforated coiling-heads 143 are mounted near the ends of the plates 50 and provided with coiling spindles 144 through which the outer wires 23 pass. On the lower ends of the spindles are gear-pinions 145 actuated by racks 146 on a rack-bar 147 slidably mounted on the plate 50. Said bar is also provided with a rack 148, engaged by a rack-arm 149 on a rock-shaft 150 supported from the bar 50 at one end, and at the other end held in a bearing 151 in a frame 152 loosely supported on the shaft 10. Secured to the inner end of the shaft 150 is a crank arm 153 provided with a slot 154 in which is adjustably held a pin 155 carrying a roller 156 engaged by a cam-track 157 in the edge of a cam-wheel 158, fixed to the shaft 10. Each rotation of the shaft 10 causes a reciprocating movement of the rack-bar 147, causing the ends of the stay wire 52 to be coiled upon the outer strand wires. This operation is carried on simultaneously with the seating of the ties 138 at the intersections of the stay wire with the intermediate strand wires. The coiling mechanism last above described is not considered to be novel in itself, and nothing is claimed broadly thereon.

For convenience of construction the heads 102 may be formed in two parts, the division being along the line of the channel 104, as shown in Figs. 16 and 22, the parts of two different heads being mounted on one plate 103, which is mounted diagonally on the bar 101.

What I claim as my invention, and desire to secure by Letters Patent of the United States, is:

1. In a machine of the class described, a former head mounted therein so as to be capable of longitudinal reciprocation, provided with a longitudinal channel, and having a cross-channel for the introduction of a wire into said former-head; a plunger capable of working longitudinally in said channel; and a former-bar adapted to be moved longitudinally of said channel in a plane at right angles to the plane of said cross-channel.

2. In a machine of the class described, a suitably mounted former-head, provided with a longitudinal channel and cross-channel at an angle therewith; mechanism for introducing a length of wire into said cross-channel; means for severing said wire; a plunger capable of working longitudinally in said channel, and held normally with its outer end at the inner end of said channel; and a former-bar adapted to be moved longitudinally of said channel, to engage the severed wire and deliver it to said plunger, in form to be seated on the wires of a fence.

3. In a machine of the class described, a former-head mounted therein so as to be capable of being longitudinally reciprocated, and provided with a longitudinal channel and cross-channel at an angle with said channel, means for introducing a succession of wires into said cross-channel of suitable lengths for wire fence ties; a plunger adapted to have longitudinal play in said channel, and normally positioned at the inner end thereof; and a former-bar adapted to be moved longitudinally of said channel, to successively engage said wires and deliver them to said plunger in bent form.

4. In a wire fence machine, a former-head mounted therein so as to be capable of being longitudinally reciprocated, and provided with a longitudinal channel and cross-channel at an angle therewith, and having a longitudinal slot in one side of said channel, and a groove in the opposite side thereof; a plunger capable of longitudinal movement in said channel; and a former-bar, provided with a finger capable of being introduced into said slot and projected across said channel into said groove.

5. In a wire fence machine, a former-head mounted therein so as to be capable of being reciprocated longitudinally, and provided with a longitudinal channel and cross-channel at an angle therewith, and having a longitudinal slot in one side of said channel; a plunger adapted to move longitudinally of said channel; a former-bar provided with a finger entering said slot and channel; mechanism for imparting a reciprocating movement to said plunger; and means for giving a corresponding movement to said former-bar coincidently with the movement of said plunger.

6. In a wire fence machine, a suitably mounted former-head, provided with a longitudinal channel and cross-channel at an angle therewith, and having a longitudinal slot in one of its sides; a plunger adapted to be moved longitudinally of said channel; a former-bar provided with a finger entering said slot and channel; mechanism for imparting a reciprocating movement to said plunger; mechanism for giving a corresponding movement to said former-bar coincidently with the movement of said plunger; and means for withdrawing said former-bar from said channel near the end of the outer movement of said plunger.

7. In a wire fence machine, a former-head suitably mounted therein and provided with a longitudinal channel inclined diagonally to the base of the machine and a cross-channel transversely of said channel, and in line with the plane thereof; a suitably mounted guide-bar provided with a channel in line with said cross-channel, and adapted to direct a wire thereto, to be formed into tie wires; means for conveying a wire to said guide-bar; and means for severing said wire at the point of entrance to said former-head.

8. In a wire fence machine, a former-head reciprocably mounted therein, and provided with a longitudinal channel inclined diagonally to the base of the machine and a cross-channel transversely of said channel and in line with the plane thereof; a suitably mounted guide-bar provided with a channel in line with said cross-channel, and adapted to direct a wire thereto, to be formed into tie wires; means for conveying a wire to said guide-bar, and means for imparting a reciprocating movement to said former-head to cause a separation between said cross-channel and the channel in said guide-bar.

9. In a wire fence machine, a former-head reciprocably mounted therein, and provided with a longitudinal channel inclined diagonally to the base of the machine and a cross-channel transversely of said channel and in line with the plane thereof; a suitably mounted guide-bar having a channel in line with said cross-channel and adapted to direct a wire thereto to be formed into tie-wires; a plunger reciprocatingly mounted in said machine and capable of movement longitudinally of said first-named channel; and a former-head adapted to be given a reciprocating movement in said first-named channel at right angles to the plane of said cross-channel.

10. In a wire fence machine, a suitably mounted former-head, provided with a longitudinal channel inclined diagonally to the base of the machine and a cross-channel transversely of said channel and in line with the plane thereof; a plunger capable of working longitudinally in said channel; a former-bar adapted to be moved longitudinally of said channel at right angles to said cross-channel; a cross-bar mounted rigidly in said machine; a guide-bar fixed in said cross-bar and provided with a channel in line with the cross-channel in said former-head; a tube capable of conveying a wire forwardly and downwardly to said guide-bar; and feed-rolls mounted in said machine and adapted to conduct a wire into and through said tube.

11. In a wire fence machine, a former-head reciprocably mounted therein, and provided with a longitudinal channel and cross-channel at an angle therewith; a die-plate fixed in said machine in front of said former-head; a die fixed in said die-plate, in line with said former head, and spaced-apart therefrom; a guide-bar mounted in said machine and provided with a channel in line with said cross-channel and adapted to direct a wire thereto; means for reciprocating said former head for the purpose of cutting said wire; and means for continuing the movement of said former-head to bring the end thereof into engagement with said die.

12. In a wire fence machine, a suitably mounted former-head, provided with a longitudinal channel and a cross-channel at an angle thereto; a cross-bar slidably mounted below said former-head, and carrying a clamp-plate; a former-bar fixed in said clamp-plate and provided with a finger entering said channel; a cross-bar slidably mounted in rear of said former-bar and operatively connected therewith; means for actuating said first-named cross-bar; and means for actuating said last-named cross-bar coincidently therewith, to cause a reciprocating movement of said former-bar finger within the former-head.

13. In a wire fence machine, a suitably mounted former-head provided with a longitudinal channel and means for introducing a length of wire transversely of said channel; a plunger capable of a reciprocating movement in said channel; a cross-bar slidably supported beneath said former-head; a former-bar supported on said cross-bar and provided with a finger normally held in said channel, a cross-bar slidably mounted in rear of said former-bar and operatively connected therewith; means for giving a reciprocating movement to said plunger; mechanism for actuating said first-named cross-bar coincidently with said plunger; and mechanism for actuating said last-named cross-bar coincidently with said first-named bar, causing a movement of said former-bar similar to that of said plunger and coincident therewith.

14. In a wire fence machine, a suitably mounted former-head provided with a longitudinal channel and means for introducing a length of wire transversely of said channel; a plunger capable of being reciprocated in said channel; a cross-bar slidably supported beneath said former-head; a former-bar supported on said cross-bar and provided with a finger normally held in said channel; a cross-bar slidably mounted in rear of said former-bar and operatively connected therewith; means for giving a reciprocating movement to said plunger; mechanism for actuating said first-named cross-bar coincidently with said plunger; mechanism for actuating said last-named cross-bar coincidently with said first-named bar, causing a reciprocating movement of said former-bar substantially similar to that of the plunger; and means for giving to said first-named bar an independent movement rearwardly to cause the withdrawal of the former-bar from the path of said plunger.

15. In a wire fence machine, mechanism for feeding a line wire into and through the machine; mechanism for feeding a stay wire into the machine at right angles with said line wire; a former-head reciprocably supported in said machine in rear of said wires at the intersection thereof, and provided with a longitudinal channel in a plane diagonal with the line of movement of said wires, and a cross-channel at an angle with said main channel and adapted to receive a length of wire to be formed into a tie-wire; means for introducing a length of wire into said cross-channel; a plunger capable of being reciprocated in said main channel; mechanism for bending said wire and delivering it to said plunger; a die rigidly supported in line with said former-head, on the opposite side of said cross-wires; means for reciprocating said former-head to bring the same in contact with said die; and means for simultaneously operating said plunger to seat the tie-wire upon the line and stay-wires at the point of intersection thereof.

16. In a wire fence machine, mechanism for feeding a strand wire into and through said machine; mechanism for feeding a stay wire into said machine transversely of said strand wire; mechanism for delivering said stay wire in position to be secured to said strand wire; a former-head reciprocably supported in said machine in rear of said wires at the point of intersection thereof and provided with a longitudinal channel inclined diagonally with the line of said wires and means for introducing a length of wire into said head transversely of said channel; a plunger capable of being reciprocated in said channel; a former-bar reciprocably mounted in said machine and provided with a finger capable of movement in said channel upon said former-bar being reciprocated; means for feeding a section of wire into said former-head in position to be formed into a tie-wire; a die rigidly mounted in said machine in line with said former-head and on the opposite side of said cross-wires therefrom; means for reciprocating said former-head to bring the same in contact with said die; and means for simultaneously operating said plunger to seat the tie-wire upon the strand and stay wires at the point of intersection thereof.

17. In a wire fence machine, mechanism for feeding a strand wire into and through the machine; mechanism for feeding a stay wire into the machine transversely of the line of movement of the strand wire; mechanism for delivering said stay wire in position to be secured to said strand wire; a former-head reciprocably supported in said machine in rear of said wires at the point of intersection thereof and provided with a longitudinal channel inclined diagonally with the line of said wires and having means for the introduction into said former-head of a length of wire; a die fixed in said machine in line with said former-head and on the opposite side of said wires therefrom; a cross-bar slidably mounted below said former-head; a former-bar pivotally mounted on said cross-bar and adapted to have a reciprocating movement at its upper end in the channel in said former-head; a cross-bar slidably mounted in rear of said former-bar and operatively connected therewith; a plunger capable of reciprocating movement in said channel; means for suitably actuating said plunger; means for operating said former-head to bring the end thereof into contact with said die; means for actuating said first-named cross-bar to give a reciprocating movement to the lower end of said former-bar; means for actuating said last-named cross-bar to give a similar movement to the upper end of said former-bar coincidently with the movement of the lower end thereof; and means for actuating said first-named cross-bar to give a reciprocating movement to the lower end of said former-bar independently of the upper end thereof, causing the withdrawal of such upper end from the path of said plunger.

18. In a wire fence machine, mechanism for feeding a strand wire into and through the machine; mechanism for feeding a stay wire into the machine transversely of the line of movement of said strand wire; mechanism for delivering said stay wire in position to be secured to said strand wire; a former-head reciprocably supported in said machine in rear of said wires at the point of intersection thereof, and provided with a longitudinal channel inclined diagonally to the line of movement of said wires and having a cross-channel for the introduction of a wire transversely of said main channel, a plunger capable of reciprocating movement in said main channel; a guide-bar mounted above said former-head and provided with a channel in line with said cross-channel and normally in register therewith; a die rigidly supported in line with the outer end of said former-head; means for giving a reciprocating movement to said former-head, to move said cross-channel out of alinement with said guide-channel and a further movement to cause the engagement of the end of said former-head with said die; and a former-bar, reciprocatingly mounted in said machine, and capable of movement longitudinally of said former-head channel.

19. In a wire fence machine, a frame; a cross-beam laterally slidable therein; former-head supporting means secured to the lower face of said beam and provided with transverse passages; a former-head fixed to said supporting means and provided with a longitudinal channel and cross-channel at an angle therewith; a cross-beam in rear of said support and laterally slidable in said frame; a plunger carried by said last-named cross-beam and adapted to have longitudinal play in said channel; mechanism for feeding a length of wire into said cross-channel; a die supported in line with said former-head; means for actuating said first-named cross-beam to give a reciprocating movement to said former-head; means for actuating said last-named cross-beam to give a reciprocating movement to said plunger; and means for bringing said former head and die into operative relations.

20. In a wire fence machine, a frame; a cross-beam laterally slidable therein; means for supporting a former-head from said cross-beam; a former-head secured to such support and provided with a longitudinal channel and cross-channel at an angle therewith; a cross-beam in rear of such support and laterally slidable in said frame; a plunger carried by said last-named cross-beam adapted to have longitudinal play in said channel; mechanism for introducing a length of wire into said cross-channel; mechanism for bending such wire and delivering it to said plunger; a die in line with said former-head; means for actuating said first-named cross-beam to give a reciprocating movement to said former-head; means for actuating said last-named cross-beam to give a reciprocating movement to said plunger; means for actuating said wire-bending mechanism; and means for bringing said former-head and die into operative relations.

21. In a wire fence machine, mechanism for feeding a strand wire into and through the machine; mechanism for feeding a stay wire into the machine in position to be attached to the strand wire; a cross-beam mounted in said machine in rear of said strand wire, and laterally slidable; a former-head supported by said cross-beam provided with a longitudinal channel and cross-channel at an angle therewith; a cross-beam in rear of said former-head also laterally slidable; a plunger carried thereby adapted to have movement longitudinally of said main channel; a former-bar operative in said channel; a die in line with said former-head; means for introducing a length of wire into said cross-channel, to be formed into a tie wire; means for actuating said first named beam to reciprocate said former-head; means for actuating said last-named beam to reciprocate said plunger; and means for giving a reciprocating movement to said former-bar.

22. In a wire fence machine, a cross-beam laterally slidable therein; a former-head support carried thereby; a former-head secured to said support and provided with a longitudinal channel inclined diagonally and a cross-channel at an angle therewith; a cross-beam laterally slidable in said machine in rear of said former-head; a plunger carried thereby and capable of longitudinal movement in said channel; mechanism for introducing a length of wire into said cross-channel; mechanism for feeding a line of wire vertically across the end of said former-head; a cross-plate inclined diagonally to the line of movement of said last-named wire and adapted to receive a length of stay wire; means for actuating said cross-plate to bring said stay wire into position to be attached to said vertical wire; a die in line with said former-head; means for actuating said first-named cross-beam to suitably oscillate said former-head; means for actuating said last-named cross-beam to suitably oscillate said plunger; means for bending said length of wire in said former-head; and means for causing the contact of said former-head and die.

23. In a wire fence machine, a pull-out drum for the strand-wires, provided with diagonally disposed recesses on its periphery, a pair of arms pivoted on the shaft of said drum; a roller supported in said arms conveniently to said drum; and means for suitably actuating said arms, to give an oscillating movement to said roller.

24. In a wire fence machine, mechanism for feeding the strand wires of the fence, comprising a rotary drum provided with diagonal recesses on its periphery; a pair of arms fulcrumed on the shaft of said drum; a roller supported by said arms conveniently to said drum; a shaft rotatably mounted in said machine; and a pair of eccentrics on said shaft operatively connected with the ends of said arms opposite to said roller.

25. In a wire fence machine, mechanism for feeding a plurality of strand wires vertically therethrough; a die-plate supported in said machine in front of said wires, and provided with a longitudinal channel in that face adjacent to said wires; a cross-plate slidable along the face of said die-plate and provided with a longitudinal channel adapted to receive a stay wire; means for feeding a stay wire thereto; and means for elevating said cross-plate to bring said stay wire into position to be delivered to said die-plate.

26. In a wire fence machine, mechanism for feeding a plurality of strand wires vertically therethrough; a die-plate supported in said machine in front of said wires; a plurality of dies fixed in said die-plate, and provided with transverse grooves in their outer ends; a cross-plate capable of inclined movement with relation to said strand wires, and provided with a channel adapted to receive a length of stay wire; means for feeding a length of stay wire thereto; means for actuating said cross-plate to deliver said wire in position in said die-plate; and a plurality of former-heads in line with said dies and capable of being given a reciprocating movement.

27. In a wire fence machine, mechanism for feeding a plurality of strand wires into and through the machine; a die-plate mounted transversely of the line of feed of said wires and adapted to receive a cross-wire on that face thereof adjacent to said wires; a cross-bar slidably mounted in inclined position with relation to the line of movement of said strand wires; a cross-plate attached to said cross-bar and provided with a channel adapted to receive a cross-wire, such channel being normally closed by said die-plate; means for introducing a section of wire of pre-determined length into said cross-plate; and means for reciprocating said cross-bar to convey said wire section into position to be attached to said strand wires.

28. In a wire fence machine, mechanism for feeding a plurality of strand wires into and through the machine; a die-plate mounted transversely of the line of travel of said strand wires, and adapted to receive a stay-wire section in that face adjacent to said strand wires; a cross-bar slidably mounted in inclined relation to the line of movement of said strand wires; a cross-plate fixed to said cross-bar and provided with a channel adapted to receive a stay-wire section; a pair of rock-arms fulcrumed in said machine and operatively connected with said cross-bar; a cross-shaft rotatably mounted in said machine; cams on said shaft capable of actuating said rock-arms; means for feeding a section of stay-wire to said cross-plate; and means for rotating said shaft to cause the oscillation of said rock-arms, reciprocating said cross-bar and conveying said stay-wire section to said die-plate, in position to be secured to said strand wires.

29. In a wire fence machine, mechanism for feeding a plurality of strand wires into and through the machine; a die-plate mounted transversely of the line of travel of said strand wires, and adapted to receive a stay-wire section in that face thereof adjacent to said strand wires; a cross-bar slidably mounted in inclined position with relation to the line of feed of said strand wires; a cross-plate fixed to said cross-bar and provided with a channel adapted to receive a stay-wire section; a plurality of dies fixed in said die-plate in line with said strand-wires; a plurality of former-heads reciprocably mounted in said machine in opposition to said dies; means for feeding a stay-wire section to said cross-plate; means for reciprocating said cross-bar to bring said stay-wire section in position between said dies and former-heads; and means for bringing said former-heads into operative position with said dies, with the strand wires and stay wire in position therein.

30. In a wire fence machine, mechanism for feeding a plurality of strand wires through the machine; a die-plate mounted transversely of the line of travel of said strand wires; a plurality of dies mounted therein; a cross-bar slidably mounted below said die-plate; a cross-plate fixed to said cross-bar and provided with a channel adapted to receive a stay-wire section; feed-rolls adapted to introduce a length of wire into said cross-plate channel; means for intermittently rotating said feed-rolls; means for severing said wire; and means for reciprocating said cross-bar to bring said severed wire into position to be attached to said strand-wires.

31. In a wire fence machine mechanism for feeding a plurality of strand wires through the machine; a die-plate mounted transversely of the line of feed of said strand wires, and adapted to receive a transverse stay wire section; a plurality of dies fixed in said plate in line with said strand wires; a cross-bar slidably mounted in inclined position with reference to said strand wires; a cross-plate fixed to said cross-bar and provided with a channel adapted to receive a stay-wire section; means for introducing a stay wire section into said cross-plate; means for actuating said cross-bar to convey said stay wire to said die plate in position to be secured to said strand wires; a plurality of former-heads adapted to hold said stay wire in position for attachment to said strand wires at the intermediate intersections thereof; and means for coiling the ends of said stay wire upon the outer strand wires while being held in such position.

32. In a wire fence machine, mechanism for feeding a plurality of strand wires through the machine; a die-plate mounted transversely of the line of feed of said strand wires and provided with a plurality of dies in line with said wires; a cross-bar slidably mounted in inclined position with reference to said strand wires; a cross-plate fixed to said cross-bar, and adapted to receive a stay-wire section; means for feeding successive lengths of wire into said cross-plate; means for actuating said cross-bar to conduct said lengths of wire successively to said dies, in position to be secured to said strand wires; a plurality of former-heads mounted in said machine in opposition to said dies and adapted to be given a reciprocating movement with reference thereto; means for simultaneously feeding a plurality of tie wires to said former-heads; means for suitably bending the same; and means for simultaneously seating said ties at the intersections of said stay and strand wires diagonally thereof.

33. In a wire fence machine, mechanism for feeding a plurality of strand wires through the machine with an intermittent movement; a die-plate mounted transversely of the line of feed of said strand wires, and provided with a series of dies in line with said strand wires; a cross-bar slidably mounted beneath said die-plate; a cross-plate fixed to said bar and provided with a channel adapted to receive a stay-wire section; means for introducing successive lengths of wire into said cross-plate; means for actuating said cross-bar to bring said stay wires in position between said dies and strand wires; a plurality of former-heads reciprocably mounted in opposition to said dies, and each provided with a longitudinal channel and cross-channel at an angle therewith; means for feeding a plurality of wire sections into said cross-channels, to be formed into tie-wires; formers adapted to bend said sections into tie-wires in said former-heads; plungers adapted to eject said ties from said former-heads; means for suitably actuating said formers; means for reciprocating said former-heads to bring them into operative relation with said dies; and means for actuating said plungers to cause the ejection of the tie wires, and seating thereof upon the strand and stay wires at the points of intersection thereof.

34. In a wire fence machine mechanism for feeding a plurality of strand wires through the machine with an intermittent movement; a die-plate mounted transversely of the line of feed of said strand wires, and provided with a series of dies in line with said wires; a cross-bar slidably mounted beneath said die-plate; a cross-plate fixed in said bar and provided with a channel adapted to receive a stay-wire section; feed-rolls adapted to feed successive lengths of wire to said cross-plate; means for actuating said rolls; means for operating said cross-bar to bring said stay wire into position in front of said dies; a plurality of former-heads in opposition to said dies, and adapted to be reciprocated with reference thereto; tie-wire forming means within said former-heads; means for feeding a plurality of wires to said former-heads; means for bending said wires into suitable form for being seated on the strand wires; means for reciprocating said former-heads to bring them into operative position with reference to said dies; means for ejecting said tie-wires from said former-heads and seating them diagonally of the points of intersection of the stay wire with the intermediate strand wires; and means for simultaneously coiling the ends of the stay wire upon the outer strand wires.

35. In a wire fence machine, mechanism for feeding a series of strand wires into the machine; mechanism for feeding a stay wire into the machine in position to be attached to the strand wires; a series of dies rigidly supported at the points of intersection of the strand and stay wires; a cross-beam mounted in rear of said strand wires so as to be reciprocable with reference thereto; former-heads supported by said cross-beam, each provided with a longitudinal channel and cross-channel; a cross-beam in rear of said former-heads so as to be capable of having a reciprocating movement with reference thereto; a series of plungers carried by said last-named cross-beam and adapted to have longitudinal play in said channels; means for feeding a plurality of wires to said cross-channels, to be formed into tie-wires; a cross-bar slidably mounted beneath said former-heads; a plurality of former-bars mounted thereon, and adapted to be reciprocated in said longitudinal channels; a cross-bar in rear of said former-bars and operatively connected therewith; means for suitably reciprocating said first named cross-beam; means for suitably reciprocating said last-named cross-beam to operate said first-plungers; means for reciprocating said first-named cross-bar to suitably operate said former-bars; means for reciprocating said last-named cross-bar to coöperate therewith; and means for actuating said first-named cross-bar independently of said last-named bar.

36. In a wire fence machine; mechanism for feeding a series of strand wires through the machine; mechanism for feeding a stay wire into the machine in position to be attached to the strand wires; a series of dies rigidly supported at the points of intersection of said strand and stay wires; a cross-beam slidably mounted in said machine and provided with former-head supporting means; former-heads fixed to such supporting means and provided with a longitudinal channel adapted to deliver a tie-wire in position diagonally of said strand and stay wires at the points of intersection thereof; a cross-beam in rear of said former-heads so as to be slidable with reference thereto; plungers supported by said last-named beam adapted to be reciprocated in said channels; a cross-beam fixed in said machine in front of said first-named cross-beam; a plurality of guide-bars therein adapted to direct a plurality of wires into said former-heads transversely of said channels; means for reciprocating said former heads to sever said wires at the point of entrance thereto; former-bars reciprocable in said channels and means for operation thereof; means for reciprocating said first named cross-beam to bring said former-heads into operative relation with said dies; and means for reciprocating said last-named movable cross-beam to reciprocate said plungers.

37. In a wire fence machine, mechanism for feeding a series of strand wires intermittently through the machine; mechanism for feeding a stay wire into the machine in position to be attached to said strand wires; a series of dies rigidly supported at the points of intersection of said strand and stay wires; a cross-beam slidably mounted in said machine in rear of said strand wires; a series of formerheads supported by said cross-beam in line with said dies, and each provided with longitudinal channels in planes inclined diagonally to the movement of said wires; a cross-beam slidably mounted in rear of said former-heads; a plurality of plungers carried by said last-named cross-beam, and adapted to be reciprocated in said channels upon the operation of said beam; a plurality of guide-bars mounted above said former-heads, and adapted to direct a series of wires thereto transversely of the channels therein; tubes guiding said wires to said guide-bars; feed-rolls supported in rear of said tubes; means for operating said feed-rolls to introduce said wires into said tubes with an intermittent movement; means for reciprocating said first-named beam to sever said wires and bring said former-heads into operative relation with said dies; former-bars capable of bending said wires in said former-heads; means for operating said former-bars; and means for reciprocating said last-named cross-beam to suitably actuate said plungers.

In testimony whereof I affix my signature in presence of two witnesses.

RAYMOND E. WEBER.

Witnesses:
W. N. HASKELL,
F. W. WHEELER.

Copies of this patent may be obtained for five cents each, by addressing the "Commissioner of Patents, Washington, D. C."